United States Patent [19]

Noda et al.

[11] 4,078,235
[45] Mar. 7, 1978

[54] OBSTACLE DETECTING SYSTEM

[75] Inventors: Hiroshi Noda; Yukiyasu Watanabe, both of Nagaoka Kyoshi, Japan

[73] Assignee: Mitsubishi Denki Kabushiki Kaisha, Tokyo, Japan

[21] Appl. No.: 692,348

[22] Filed: Jun. 3, 1976

Related U.S. Application Data

[63] Continuation of Ser. No. 486,599, July 8, 1974, abandoned.

[30] Foreign Application Priority Data

| Jul. 10, 1973 | Japan | 48-77698 |
|---|---|---|
| Mar. 6, 1974 | Japan | 49-25898 |
| May 3, 1974 | Japan | 49-49585 |

[51] Int. Cl.² .................. G01S 9/37; G01S 9/44
[52] U.S. Cl. ........................................... 343/9
[58] Field of Search ................................. 343/9

[56] References Cited

U.S. PATENT DOCUMENTS

| 3,750,171 | 9/1970 | Faris | 343/9 |
|---|---|---|---|
| 3,766,554 | 10/1973 | Tresselt | 343/9 X |
| 3,846,796 | 11/1974 | Oishi et al. | 343/9 X |
| 3,863,253 | 5/1973 | Kiyoto et al. | 343/9 |
| 3,864,678 | 2/1975 | Yamanaka et al. | 343/9 |

*Primary Examiner*—Malcolm F. Hubler
*Attorney, Agent, or Firm*—Oblon, Fisher, Spivak, McClelland & Maier

[57] ABSTRACT

An obstacle detecting system comprising an oscillating device for generating and directing to an obstacle a first oscillating signal in a first time period and a second oscillating signal having a different frequency than that of the first oscillating signal in a second time period; an antenna for receiving the signals reflected from the obstacle; a detector for mixing the signals received by the antenna and the output of the oscillating device to generate a detected signal which comprises a first signal component derived by mixing the first oscillating signal reflected by the obstacle and received by the antenna with the second oscillating signal generated by the oscillating device and a second signal component derived by mixing the second oscillating signal reflected by the obstacle and received by the antenna with the second oscillating signal generated by the oscillating device; and an information signal circuit for receiving the detected signal and generating information relating to the distance between the antenna and the obstacle and information relating to the relative velocity of the antenna and the obstacle.

11 Claims, 12 Drawing Figures

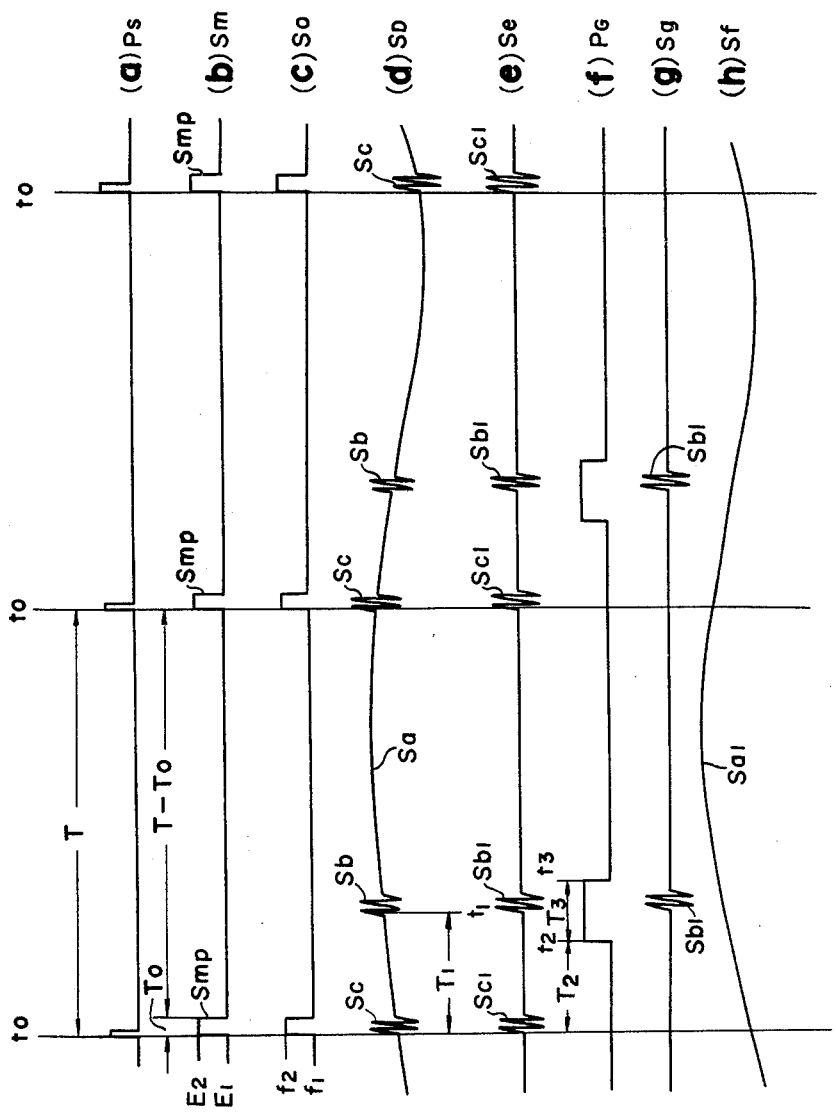

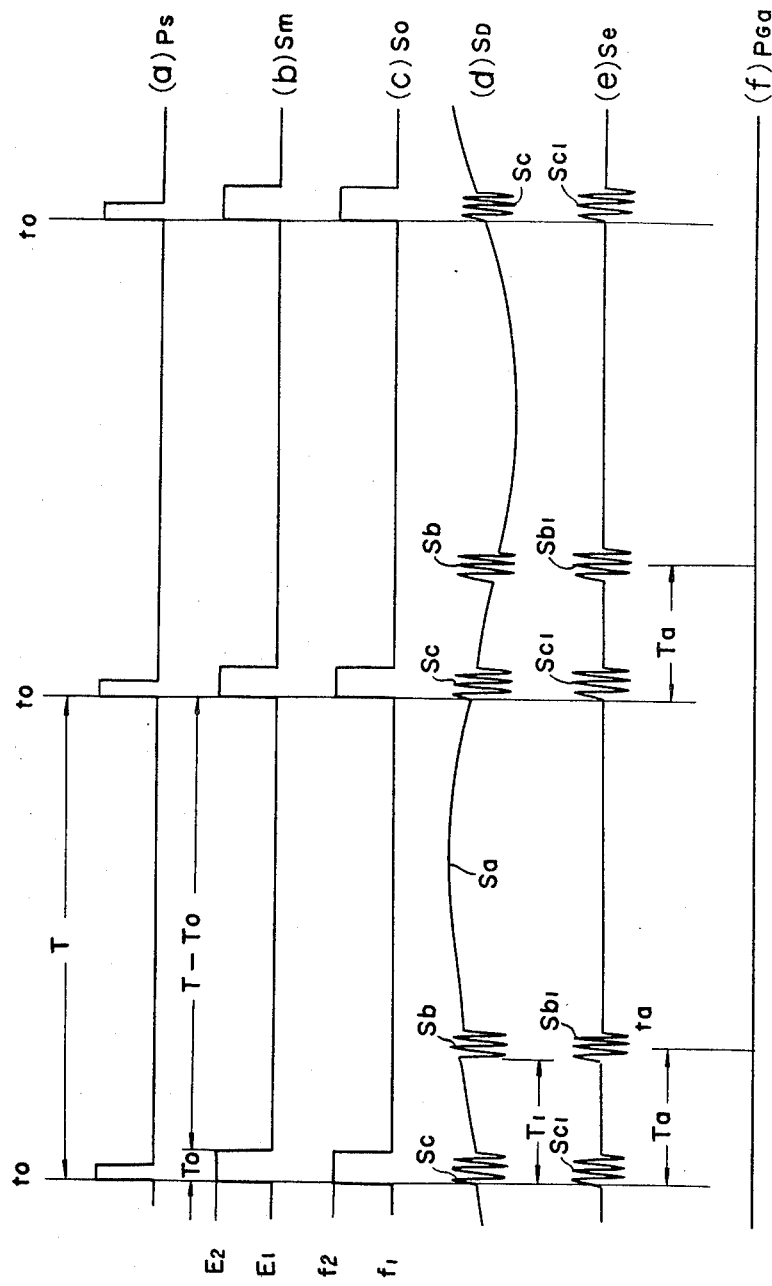

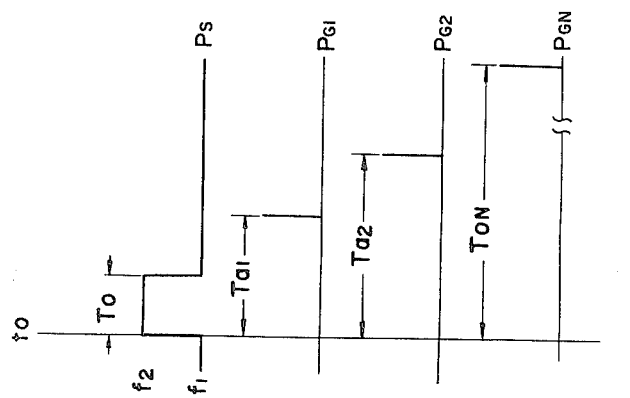

OBSTACLE DETECTING SYSTEM

This is a continuation, of application Ser. No. 486,599, filed July 8, 1974 now abandoned.

BACKGROUND OF THE INVENTION

1. Field of the Invention

The present invention relates to an obstacle detecting system which is suitable for a vehicle such as automobile. More particularly, it relates to an obstacle detecting system for detecting the distance from an obstacle and the relative velocity between the vehicle and the obstacle.

2. Description of the Prior Art

Recently, automobiles have been so widely used that traffic accidents have become commonplace. Accordingly, traffic accidents have become quite an important social problem. According to statistical data, most accidents are caused by driver error.

A need has developed for a safety device such as an automatic system for preventing collisions. In one safety device for preventing automobile accidents, knowledge of the distance to the obstacle and the relative velocity of approach must be ascertained. This is usually accomplished by radar. Heretofore, it has been known to employ a doppler radar for detecting relative velocity; a pulse radar and an AM phase difference radar for detecting distance; and a two frequency doppler radar for detecting distance and relative velocity. However, these conventional radars have certain disadvantages which preclude their practical utilization. The doppler radar can be used for detecting relative velocity. However it cannot be used for detecting distance. Accordingly, an obstacle too distant to be considered may be erroneously detected as an obstacle. Accordingly, the doppler radar, by itself, cannot be practically used. The pulse radar can be used for ascertaining distance. However, it is difficult for it to detect relative velocity. Accordingly, even though there may be no possibility of collision because of an absence of relative velocity, a rather near obstacle may be erroneously detected. Accordingly, the pulse radar, by itself, cannot be practically used. The AM phase difference radar, the FM phase difference radar and the two frequency doppler radar have the disadvantage of not providing sufficient distance information where a plurality of obstacles is involved. When there is a first obstacle present within a dangerous distance along with a second obstacle having higher reflectivity at a distance too far to be considered dangerous, the radar erroneously indicates the presence of no dangerous obstacle. The two frequency doppler is used to find distance by a phase difference formed by two transmission frequencies whereby the distance can be ascertained by a simple circuit such as may be used in a small radar for an automobile. However, when the doppler indicating relative velocity is zero or rather small, it is difficult to ascertain distance.

In order to overcome these disadvantages, it has been suggested that the doppler and the pulse radar be combined. By combining the doppler radar and the pulse radar, relative velocity can be generated by the doppler radar and distance information can be generated by the pulse radar. Where a plurality of obstacles is involved, it is possible to omit information of the distant obstacle by employing a range gate. The pulse radar can detect distance even though no relative velocity is found. However, the employment of two kinds of radars is quite expensive with the result that it is not practical.

SUMMARY OF THE INVENTION

It is an object of the present invention to provide an uncomplicated obstacle detecting system to detect distance and relative velocity. This object as well as others has been attained by providing an obstacle detecting system comprising an oscillating device for generating and directing to an obstacle a first oscillating signal in a first time period and a second oscillating signal having a different frequency than that of the first oscillating signal in a second time period; an antenna for receiving the signals reflected from the obstacle; a detector for mixing the signals received by the antenna and the output of the oscillating device to generate a detected signal which comprises a first signal component derived by mixing the first oscillating signal reflected by the obstacle and received by the antenna with the second oscillating signal generated by the oscillating device and a second signal component derived by mixing the second oscillating signal reflected by the obstacle and received by the antenna with the second oscillating signal generated by the oscillating device; and an information signal circuit for receiving the detected signal and generating information relating to the distance between the antenna and the obstacle and information relating to the relative velocity of the antenna and the obstacle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows wave-form characteristics for illustrating the operation of the first embodiment;

FIG. 5 shows wave-form characteristics for illustrating the operation of the second embodiment;

FIGS. 7 and 8 are respectively block diagrams for modified embodiments of the second embodiment;

FIG. 9 shows wave-form characteristics for illustrating the operation of the modified embodiments of FIGS. 7 and 8;

DESCRIPTION OF THE PREFERRED EMBODIMENTS

Figure 1:
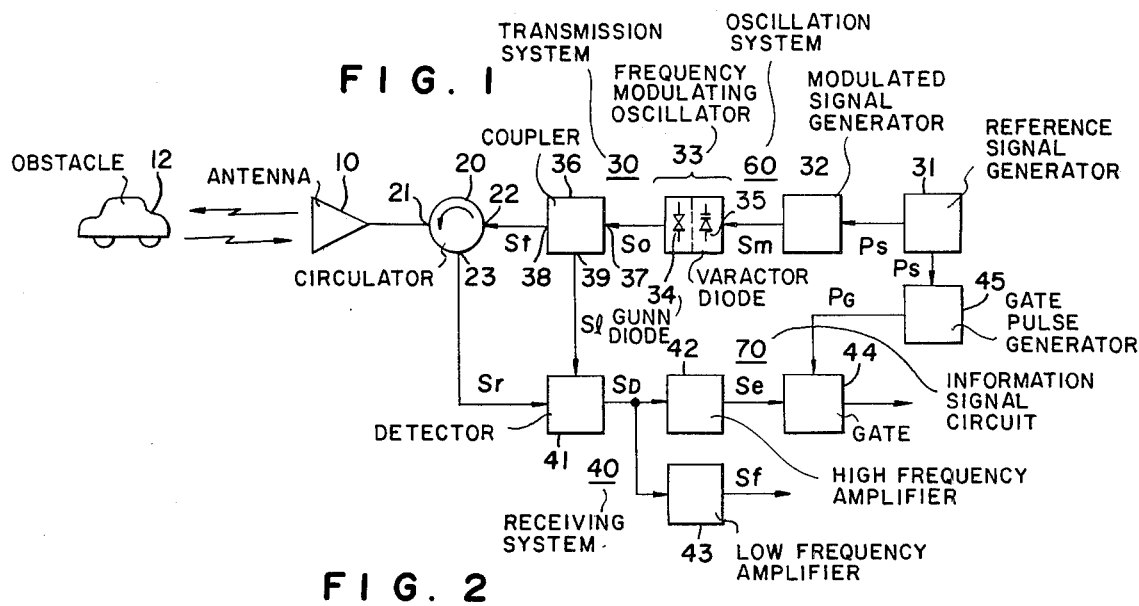
FIG. 1 is a block diagram of a first embodiment of the obstacle detecting system according to the invention.

FIG. 1 is a block diagram of a first embodiment of the invention which comprises an antenna 10, a circulator 20, a transmission system 30 and a receiving system 40. These are disposed in an automobile. The antenna 10 is an antenna for both transmitting and receiving and is disposed in the front part of an automobile. A radio wave is transmitted from antenna 10 in the forward direction of the automobile and is reflected by an obstacle 12 such as another automobile and the reflected wave is received by the antenna. The circulator 20 connects the antenna 10, the transmission system 30 and the receiving system 40 and has contacts 21, 22, 23. The contact 21 is connected to the antenna 10. The contact 22 is connected to the transmission system 30. The contact 23 is connected to the receiving system 40.

The transmission signal from the transmission system is transmitted to the contact 22 and is transmitted through contact 21 to the antenna 10. The signal received by the antenna 10 is passed through the contact 21 to the contact 23.

The transmission system 30 comprises a reference signal generating circuit 31; a modulated signal generating circuit 32; a frequency modulation type oscillator 33 for generating a transmission signal; and a coupler 36. The reference signal generating circuit 31 repeatedly generates a reference pulse $P_s$ shown in FIG. 3(a) in a predetermined period.

The modulated signal generating circuit 32 receives the reference pulse $P_s$ and generates the modulating signal $S_m$ shown in FIG. 3(b). The modulated signal $S_m$ includes a pulse $S_{mp}$ which is generated by receiving the reference pulse $P_s$. The pulse width of the pulse $S_{mp}$ is indicated as $T_o$. The modulated signal $S_m$ has a first potential level $E_1$ in the time interval $T - T_o$ and has a second potential level $E_2$ ($E_2 > E_1$) only in the time $T_o$.

The frequency modulation type oscillator 33 receives the modulating signal $S_m$ and generates the oscillation signal $S_o$ which is frequency modulated by the modulating signal $S_m$. A conventional varactor (variable reactor) modulation type gunn oscillator is employed which includes a gun diode 34 and a varactor diode 35. The gunn diode 34 imparts oscillation based on the voltage applied and the varactor diode 35 changes the oscillation frequency $f$ of the gunn diode 34 based on the change of voltage applied. The oscillation output of the gunn diode 34 is oscillation signal $S_o$.

Figure 2:
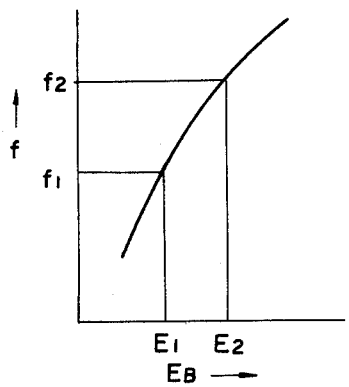
FIG. 2 shows a characteristic curve showing the relation of the modulating signal voltage to the frequency of the oscillator employed in the first embodiment.

FIG. 2 shows the oscillation frequency characteristics of the oscillator 33 and the relationship of an applied voltage $E_B$ and an oscillation frequency $f$ of the gunn diode 34 when the applied voltage $E_G$ to the gunn diode 34 is constant. The applied voltage $E_B$ is shown in quadrature axis and the oscillation frequency $f$ is shown in ordinate axis. The oscillation frequency $f$ increases depending upon the increase of the applied voltage $E_B$. When the applied voltage $E_B$ is a predetermined value $E_1$, the oscillation frequency is $f_1$. When the applied voltage $E_B$ is a predetermined value $E_2$, the oscillation frequency is $f_2$ ($f_2 > f_1$).

The modulating signal $S_m$ generated by the modulation signal generating circuit 32 is applied to the varactor diode 35. As a result, the frequency of the oscillation signal $S_o$ is $f_1$ when the modulating signal $S_m$ has a first voltage level $E_1$ and the frequency of the oscillation signal $S_o$ is $f_2$ when the modulating signal $S_m$ has a second voltage level $E_2$ as shown in FIG. 3(c).

The oscillation system 60 comprises the reference signal generating circuit 31, the modulating signal generating circuit 32 and the oscillator 33. The coupler 36 comprises three contacts 37, 38, 39. The oscillation signal $S_o$ is fed to the contact 37. A part of the oscillation signal $S_o$ fed to the contact 37 is transmitted to the contact 38 and is fed to the contact of the circulator 20 as a transmission signal $S_t$. The other part of the oscillation signal $S_o$ is transmitted to the contact 39 and is then designated local signal $S_l$. The frequency of the transmission signal $S_t$ and the local signal $S_l$ is the same as the frequency of the oscillation signal $S_o$. When the modulating signal $S_m$ is at the first voltage level $E_1$, the frequency is $f_1$. When the modulating signal $S_m$ is at the second voltage level $E_2$, the frequency is $f_2$. As a result, the first transmission wave having frequency $f_2$ is generated from the antenna 10 in the first time period $T_o$ and the second transmission wave having frequency $f_1$ is generated from the antenna 10 in the remaining time period $T - T_o$.

The receiving system 40 includes a detector 41, a high frequency amplifier 42, a low frequency amplifier 43, a gate circuit 44 and a gate pulse generating circuit 45. The information signal circuit 70 is formed by the amplifiers 42, 43, the gate circuit 44 and the gate pulse generating circuit 45. The detector 41 mixes the received signal $S_r$ from the contact 23 of the circulator 20 and the local signal $S_l$ from the contact 39 of the coupler 36 whereby the detected signal $S_D$ shown in FIG. 3(d) is generated.

The received signal $S_r$ is generated by radiating a transmission signal from antenna 10, having it reflected by obstacle 12 and received by antenna 10. The detected signal $S_D$ includes the signal component $S_a$ and two superposed signal components $S_b$, $S_c$. The signal component $S_a$ is a doppler signal generated by the second transmission wave having frequency $f_1$. The frequency is the doppler frequency $f_{d1}$ given by the following equation:

$$f_{d1} = \frac{2V}{C} f_1 \quad (a)$$

where V designates relative velocity of the obstacle 12 with respect to antenna 10 (automobile equipped with antenna 10) and C designates a propagation velocity.

The signal component $S_b$ is given by reflecting from the obstacle 12 the first transmission signal having frequency $f_2$ and having the reflected signal received by antenna 10. Of course, the signal component $S_b$ is not generated when the obstacle 12 is not present.

The frequency of the oscillation signal $S_o$ is $f_1$ at the time $t_1$. The frequency of the local signal $S_l$ is $f_1$. Accordingly, the signal component $S_b$ is given by the equation:

$$f_b = f_o + f_{d2} \quad \ldots \text{(b)}$$

wherein $f_o$ designates the difference between $f_1$ and $f_2$; $f_o = |f_2 - f_1| \ldots$ (c): $f_{d2}$ designates a doppler frequency;

$$f_{d2} = 2Vf_2/C \quad (d)$$

The time period $T_1$ for delay is given by the equation $$T_1 = 2R/C \quad (e)$$

wherein R designates the distance of the obstacle 12 from the antenna 10.

The signal component $S_c$ is generated by radiating the first transmission wave having the frequency $f_2$. When the obstacle 12 is present, the received signal based on the second transmission wave having frequency $f_1$ radiated prior to the first transmission wave is received. The frequency $f_c$ of the signal component $S_c$ is given by the equation;

$$f_c = f_o + f_{d1} \qquad (f)$$

where the frequencies $f_1, f_2$ are set so as to give $f_b \gg f_{d1}$ and $f_c \gg f_{d1}$. As a result, the signal components $S_b$, $S_c$ have a high frequency when compared to the signal component $S_a$. The high frequency amplifier 42 selects and amplifies the signal components $S_b$, $S_c$ which have a high frequency in the detected signal $S_D$ whereby the signal $S_e$ shown in FIG. 3(e) is generated.

The signal $S_e$ includes the signals $S_{b1}$, $S_{e1}$ which are generated by amplifying the signal components $S_b$, $S_c$. The low frequency amplifier 43 selects and amplifies the signal component $S_a$ having a low frequency in the detected signal $S_D$ whereby the signal $S_f$ shown in FIG. 3(h) is generated.

The gate pulse generating circuit 45 receives the reference pulse $P_s$ from the reference oscillation circuit 31 whereby the gate pulse $P_G$ is generated at the time $t_2$. Gate pulse $P_G$ is delayed for a predetermined time interval $T_2$ from the time the reference pulse $P_s$ is generated as shown in FIG. 3(f). The pulse width of the gate pulse $P_G$ is $T_3$ and the pulse $P_G$ is extinguished at the time $t_3$. The gate pulse $P_G$ is fed to the gate circuit 44 whereby the gate circuit 44 remains in its open state for the time period during which the gate pulse $P_G$ is generated.

When the signal component $S_b$ is generated during the time period when gate circuit 44 is open, the signal $S_{b1}$ is generated from the gate 44. The generating time $t_2$ of the gate pulse $P_G$ determines the minimum value $R_a$. The minimum value $R_a$ is given as follows:

$$R_a = \frac{C}{2}(T_2 - T_0) \qquad (g).$$

The extinguish time $t_3$ of the gate pulse $P_G$ is delayed for the time period $T_2 + T_3$ from the generating time $t_o$ of the reference pulse $P_s$. The predetermined maximum value $R_b$ of distance is given by the equation;

$$R_b = \frac{C}{2}(T_2 + T_3) \qquad (h).$$

When the distance R between the antenna 10 and the obstacle 12 is in the range of the minimum value $R_a$ to the maximum value $R_b$, the signal component $S_b$ is generated during the time period during which gate pulse $P_G$ is generated whereby the signal $S_{b1}$ is generated by the gate circuit 44. Accordingly, when the presence of the signal component $S_{b1}$ in the output of the gate circuit 44 is detected, it is possible to detect whether the distance of the antenna 10 to the obstacle 12 is in the range between the minimum value $R_a$ and the maximum value $R_b$ whereby the distance information can be detected.

The frequency of the signal $S_f$ generated from the low frequency amplifier 43 is the doppler frequency $f_{d1}$ given by the equation (a). The frequency $f_{d1}$ is used for generating relative velocity depending upon the relative velocity V between the antenna 10 and the obstacle 12. The relative velocity can be used for controlling the time periods $T_2, T_3$ whereby the minimum value $R_a$ and the maximum value $R_b$ can be changed depending upon the relative velocity V. As a result, the minimum value $R_a$ and the maximum value $R_b$ indicate the dangerous distance depending upon the relative velocity V. When the obstacle 12 is within dangerous distance, an alarm signal is generated depending upon the signal $S_{b1}$ from the gate circuit 44.

The time period T of the reference pulse $P_s$ is set to be long when compared to the pulse width $T_c$ of the pulse $S_{mp}$ in the modulating signal $S_m$ whereby the operation for detecting the distance R is ensured in the time period $T - T_o$. In the embodiment of FIG. 1, the signal component $S_{c1}$ is not generated by gate circuit 44 when $T_o < T_2$.

Figure 4:
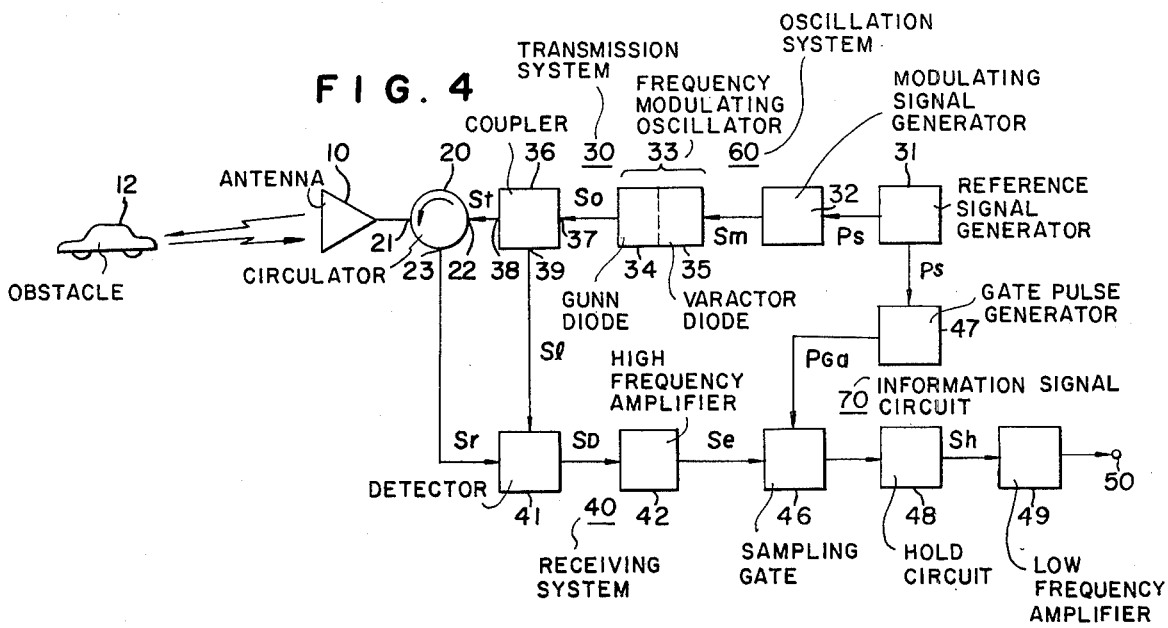
FIG. 4 is a block diagram of a second embodiment of the obstacle detecting system according to the invention.

In the second embodiment, the distance information and the relative velocity information are given by the signal component $S_{b1}$ thereby detecting the presence of an obstacle whose relative velocity is changed within a certain distance. A typical example of the second embodiment is shown in FIG. 4. The second embodiment has a structure similar to that of the first embodiment shown in FIG. 1, except for a part of the receiving system 40. Corresponding parts are designated by the same references. The receiving system 40 of FIG. 4 comprises a detector 41, a high frequency amplifying circuit 42, a sampling gate circuit 46, a gate pulse generating circuit 47, a hole circuit 48 and a low frequency amplifying circuit 49. The detector 41 and the high frequency circuit 42 are the same as that of the embodiment of FIG. 1. The output signal $S_e$ of the high frequency amplifying circuit 42 is an input signal to the sampling gate circuit 46.

The gate pulse generating circuit 47 generates a gate pulse $P_{Ga}$ having a short pulse with at the time $t_a$ which lags the generating time $t_o$ of the reference pulse $P_s$ by the time period $t_a$ as shown in FIG. 5(g) whereby the gate pulse $P_{Ga}$ is fed to the sampling gate circuit 46. The sampling gate circuit 46 generates an output by sampling the input signal $S_e$ at the time it receives a gate pulse $P_{Ga}$. The sampling output is fed to the hold circuit 48. The amplifying circuit 49 receives the output signal $S_h$ of the hold circuit 48 whereby the amplified output is fed to the terminal 50. The generating time $t_a$ of the sampling pulse $P_{Ga}$ is the sampling time. The signals $P_s$, $S_m$, $S_o$, $S_D$, $S_e$ which are the same as those of FIGS. 3(a) – (e) are shown in FIGS. 5(a) – (e).

Figure 6:
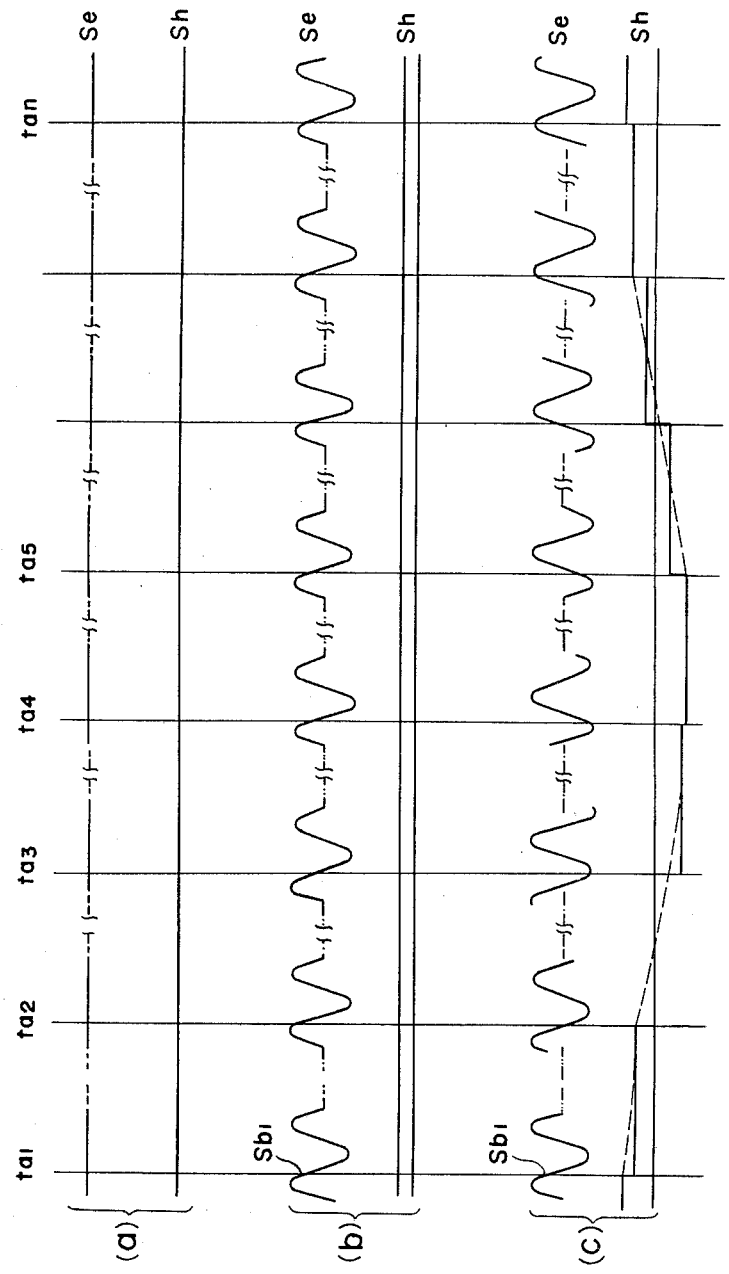
FIG. 6 shows wave-form characteristics for illustrating the operation of the second embodiment in detail.

Referring to FIG. 6, the operation of the embodiment shown in FIG. 4 will be illustrated. FIG. 6 shows waveforms of the signal $S_e$ and the signal $S_h$ at times $t_{a1}, t_{a2}, \ldots t_{an}$. For convenience, the signal $S_e$ at the sampling wave $t_{a1}, t_{a2}, \ldots t_{an}$ is an enlarged and the signal $S_e$ in the time period for two sequential sampling times is omitted. In FIG. 6(a), the signal component $S_{b1}$ is not fed as an input to the sampling gate circuit 46 at each sampling time $t_{a1}, t_{a2}, \ldots t_{an}$. In FIG. 6(b), the signal component $S_{b1}$ is fed as an input to the sampling gate circuit 46 at each sampling time $t_{a1}, t_{a2}, \ldots t_{an}$. In FIG. 6(c), the signal component $S_{b1}$ is fed to the sampling gate circuit 46 at each sampling time $t_{a1}, t_{a2}, \ldots t_{an}$ under the condition changing the relative velocity V. Each sampling time $t_{a1}, t_{a2}, \ldots t_{an}$ is delayed for the time period $T_a$ from the initial time $t_o$ of the first transmission wave having frequency $f_2$. As a result, the maximum value $R_1$ for distance is obtained as shown in the equation (i). Each sampling time is delayed for the time period $(T_a - T_o)$ from the extinguish time of the first transmission wave having frequency $f_2$. As a result, the minimum value $R_2$ for distance is obtained as shown in the equation: (j).

$$R_1 = \frac{C}{2} T_a \qquad (i)$$

-continued
$$R_2 = \frac{C}{2}(T_a - T_0) \qquad (j)$$

When the signal $S_{b1}$ is not detected at each sampling time $t_{a1}, t_{a2}, \ldots t_{an}$ as shown in FIG. 6(a), the level of the signal $S_h$ does not fluctuate. Even though the signal $S_{b1}$ is detected at the time $t_{a1}, t_{a2}, \ldots t_{an}$, when relative velocity V is not detected as shown in FIG. 6(b), the sampling values at each of the times are the same whereby the level of the signal $S_h$ is maintained constant. However, when the signal $S_{b1}$ is detected at each sampling time $t_{a1}, t_{a2}, \ldots t_{an}$ and the relative velocity V is changed, as shown in FIG. 6(c), the sampling value at each of the sampling times is subsequently changed whereby the fluctuation of the level of the signal $S_h$ is detected. The change of level of the signal $S_h$ is based on the doppler frequency $f_{d2}$ and the frequency $f_o$ shown by the equation (b). Thus, the sampling repeating frequency that is the repeating frequency ($f_3 = 1/T$) of the first transmission wave having frequency $f_2$ is set higher than the maximum doppler frequency detected and quite lower than the frequency ($f_o = f_1 - f_2$). Accordingly, when the envelope component of level change of the output signal $S_h$ of the hold circuit 48 is amplified by the low frequency amplifier 49 connected to the hold circuit 48, the signal $S_{b1}$ is found at the sampling times $t_{a1}, t_{a2}, \ldots t_{an}$. Moreover, the output having doppler frequency $f_{d2}$ is given by the low frequency amplifier 49 only when the relative velocity V is changed. As a result, the output having doppler frequency $f_{d2}$ is fed from the low frequency amplifier 49 only when the distance of the antenna 10 to the obstacle 12 is within $R_1 - R_2$ and the relative velocity is changed. When the output having frequency $f_{d2}$ is generated as the output of the low frequency amplifier 49, the distance of the obstacle 12 can be detected from the time period $T_a$, $T_o$ and the relative velocity V can be detected from the frequency $f_{d2}$ depending upon the equation (b). When $T_o < T_a$, the signal $S_c$, $S_{c1}$ which is generated by transmitting the first transmission wave having the frequency $f_2$ is not generated as an output of the low frequency amplifier 49.

Figure 7:
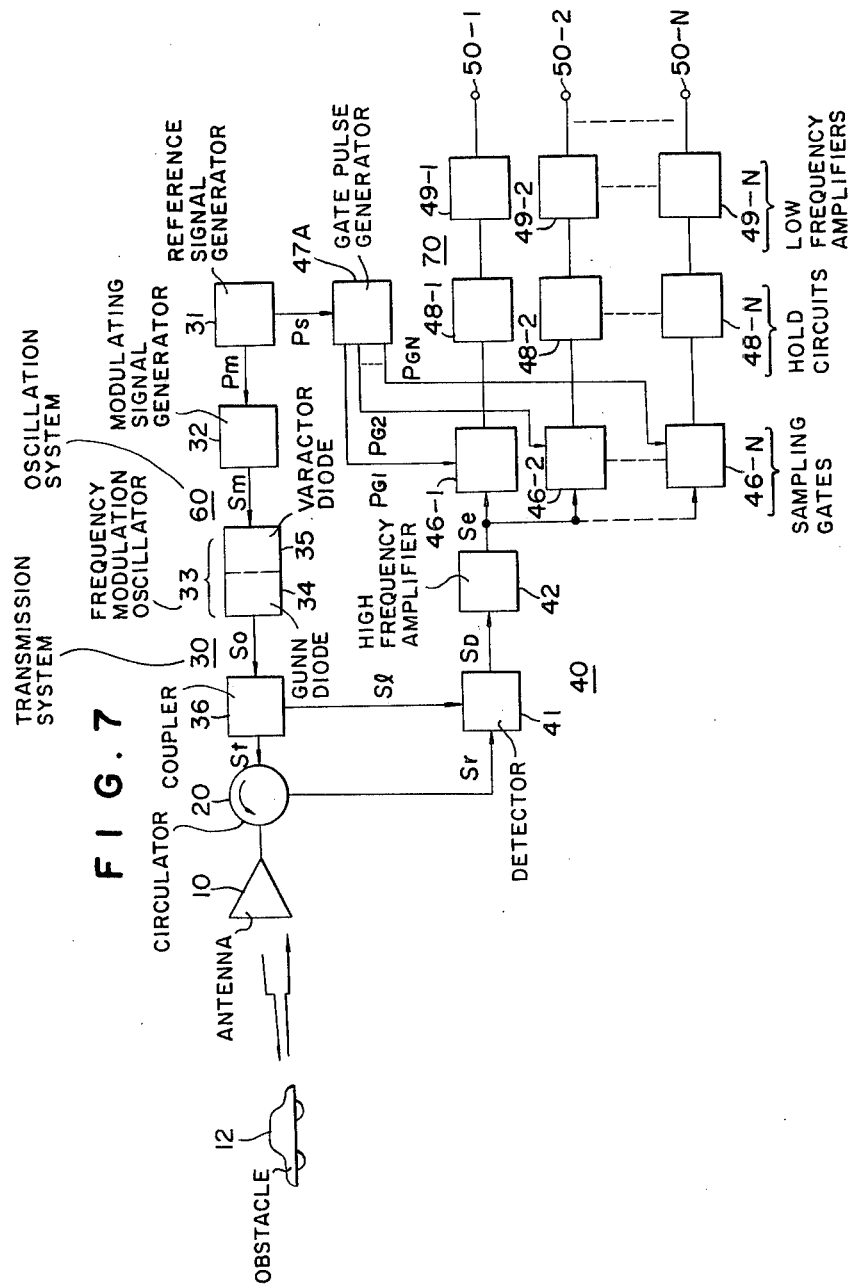

FIG. 7 is one modification of the second embodiment of FIG. 4. The embodiment of FIG. 7 includes N members as sampling gate circuits 46-1, 46-2, ... 46-N; N members of hold circuits 48-1, 48-2 ... 48-N; N members of low frequency amplifiers 49-1, 49-2 ... 49-N. The sampling gate circuits 46-1, 46-2 ... 46-N receive the signal $S_e$ from the high frequency amplifier 42 to feed the sampling outputs to the hold circuits 48-1, 48-2 ... 48-N. The low frequency signal in the output signals of the hold circuits 48-1, 48-2 ... 48-N is amplified by the low frequency amplifiers 49-1, 49-2 ... 49-N and is fed to the terminals 50-1, 50-2 ... 50-N In the embodiment of FIG. 7, the gate pulse generator 47A generates N gate pulses $P_{G1}, P_{G2} \ldots P_{GN}$ whose initiation times are different. The gate pulses $P_{G1}, P_{G2} \ldots P_{GN}$ are respectively fed to the sampling gates 46-1, 46-2, ... 46-N. The gate pulse generator 47A receives the reference pulse $P_s$ from the reference signal generating circuit 31 in order to generate the gate pulses $P_{G1}, P_{G2}, \ldots P_{GN}$.

FIG. 9 shows the relation of the reference pulse $P_s$ to the gate pulses $P_{G1}, P_{G2}, \ldots P_{GN}$. The gate pulse $P_{G1}$ is initiated after a time period $T_{a1}$. The gate pulse $P_{G2}$ is initiated after a time period $T_{a2}$ and the gate pulse $P_{GN}$ is initiated after a time period $T_{aN}$ from the time $t_o$ where $T_o < T_{a1} < T_{a2} < \ldots T_{aN}$. When the distances R of the obstacle 12 are respectively $$\frac{C(T_{a1} - T_0)}{2} \sim \frac{C T_{a1}}{2}; \frac{C(T_{a2} - T_0)}{2} \sim \frac{C T_{a2}}{2},$$
$$\frac{C(T_{aN} T_0)}{2} \sim \frac{C T_{aN}}{2}$$

and the relative velocity V is changed, the low frequency signal having doppler frequency $f_{d2}$ is fed to the terminals 50-1, 50-2 ... 50-N.

FIG. 8 shows another modification of a second embodiment. The embodiment of FIG. 8 includes a gate pulse generating circuit (47B) driven by the reference pulse $P_s$. The operation for initiating sequentially each m of gate pulses $P_{G1}, P_{G2}, \ldots P_{GN}$ shown in FIG. 9 is repeated by the gate pulse generator. All of the gate pulses are sequentially fed to the sampling gate circuit 46. In the embodiment of FIG. 8, N members of the gate circuits 51-1, 51-2, .... 51-N are connected to the output terminals of the low frequency amplifier 49. The gate circuits 51-1, 51-2, ... 51-N are continuously in their OFF state during the time period receiving m of each gate pulses $P_{G1}, P_{G2}, \ldots P_{GN}$. When m of the gate pulses $P_{G1}$ are fed, the gate circuit 51-1 is in its OFF state. When the low frequency signal having doppler frequency $f_{d2}$ is transmitted by m of the gate pulses $P_{G1}$, the signal is fed to the output terminal 50-1. The other gate circuits are operated in the same manner. For example, when m of the gate pulses $P_{GN}$ are transmitted to the sampling gate circuit 46, the gate circuit 51-N is continuously in its OFF state. The output signal of the low frequency amplifying circuit 49 generated in the OFF state is fed to the terminal 50-N. It is possible to detect whether the obstacle 12 whose relative velocity is changed is in the range of $$\frac{C(T_{a1} - T_0)}{2} \sim \frac{C T_{a1}}{2}; \frac{C(T_{a2} - T_0)}{2} \sim \frac{C T_{a2}}{2}$$
$$\frac{C(T_{aN} - T_0)}{2} \sim \frac{C T_{aN}}{2}$$

by detecting the signal at the output terminals 50-1, 50-2, ... 50-N wherein m should be enough to detect the doppler frequency $f_{d2}$.

Figure 10:
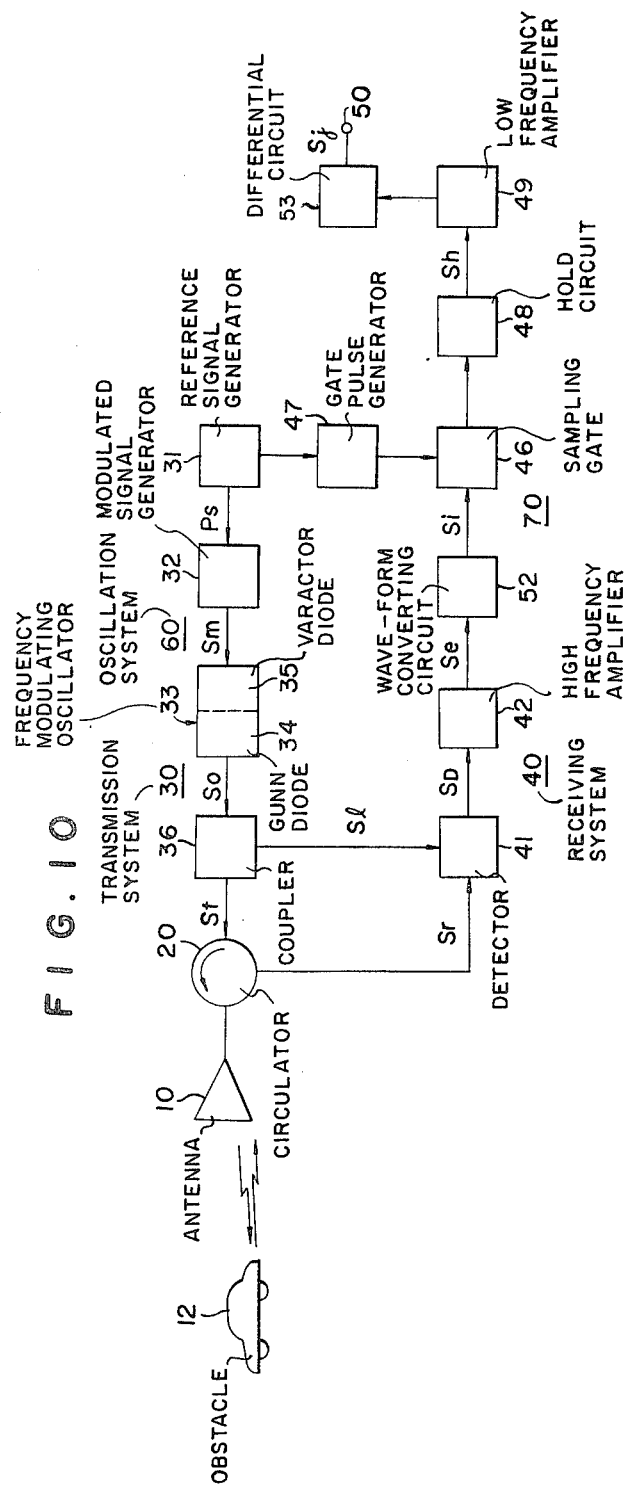
FIG. 10 is a block diagram of a third embodiment of the obstacle detecting system according to the invention.
Figure 11:
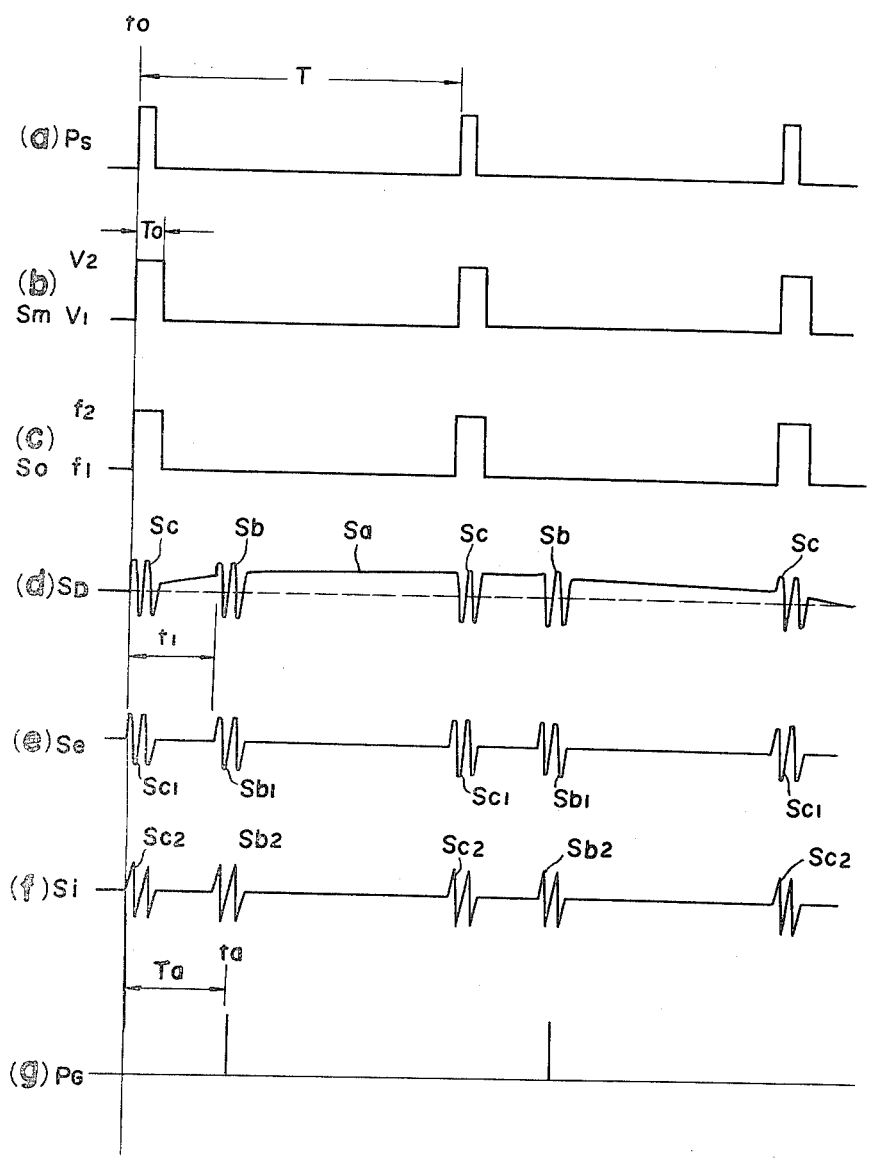
FIG. 11 shows wave-form characteristics for illustrating the operation of the third embodiment.

Referring to FIG. 10, the third embodiment of the invention is illustrated. The third embodiment detects the presence of an obstacle whose relative velocity V is changed in a predetermined distance as in the second embodiment. Moreover, it detects whether the relative velocity is increased or decreased. The third embodiment has the same structure as that of the second embodiment of FIG. 4 except for one part of the receiving system 40. The receiving system 40 of the third embodiment is the same as the receiving system 40 of FIG. 4 except that a wave-form converting circuit 52 is disposed between the high frequency amplifying circuit 42 and the sampling gate circuit 46 and a differential circuit 53 is disposed between the low frequency amplifying circuit 49 and the output terminal 50. The wave-form converting circuit 52 converts the signal $S_{b1}$ in the output signal $S_e$ of the high frequency amplifier 42 to the signals $S_{b2}$, $S_{c2}$ having saw tooth wave-forms in order to generate the signal $S_i$ shown in FIG. 11(f). The signals $S_{b2}$, $S_{c2}$ have the same frequency as $S_{b1}$, $S_{c1}$ and the signal $S_i$ is an input signal to the sampling gate circuit 46. The differential circuit 53 differentiates the output signal so that differential signal $S_j$ is generated from the output terminl 50. FIGS. 11 (a) – (e) show the signals $S_m$, $S_o$, $S_D$, $S_e$ of FIGS. 5 (a) – (e).

Figure 12:
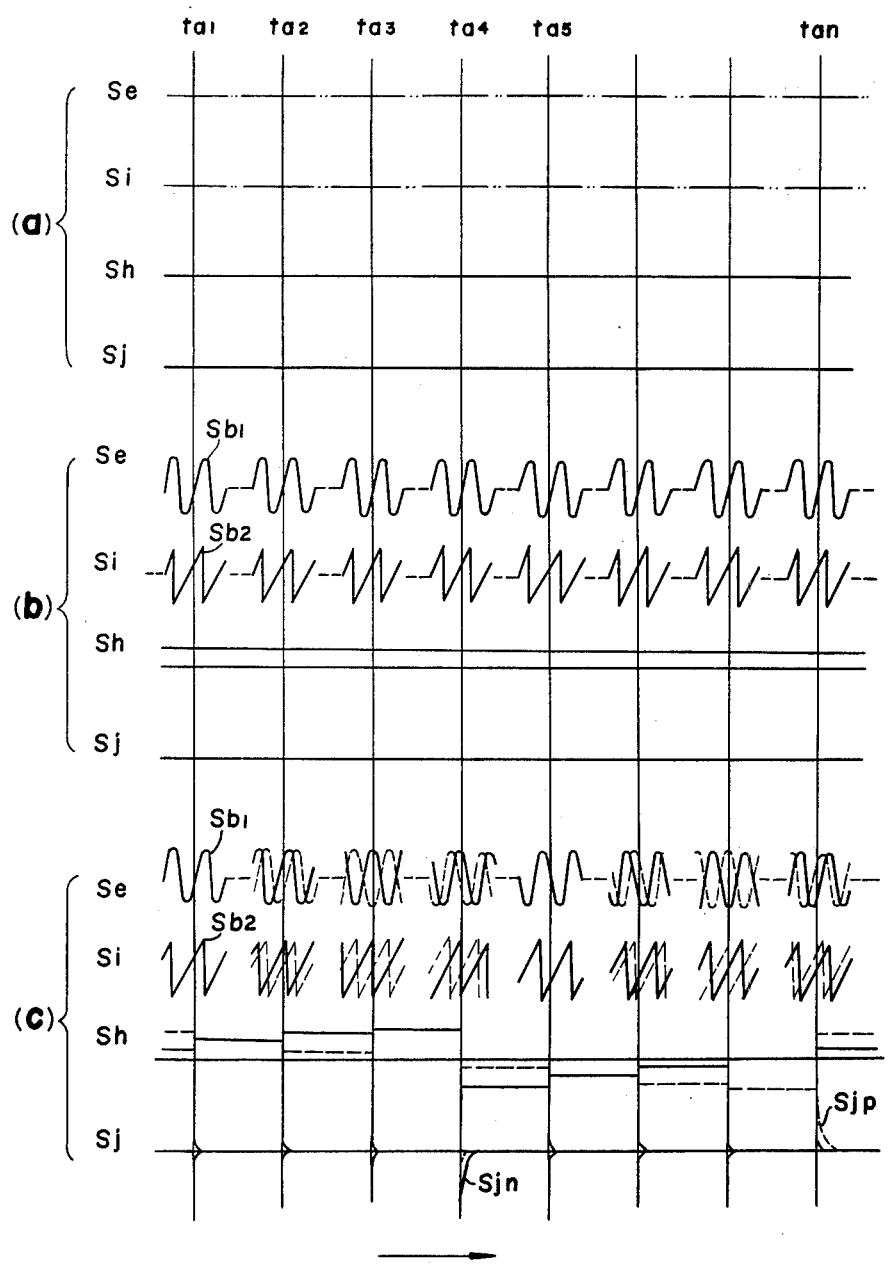
FIG. 12 shows wave-form characteristics for illustrating the operation of the third embodiment in detail.

Referring to FIG. 12, the operation of the embodiment of FIG. 10 is illustrated. FIG. 12 shows signals $S_e$, $S_i$, $S_h$, $S_j$ at the sampling time $t_{a1}$, $t_{a2}$, ... $t_{an}$. The signals $S_e$, $S_i$ in the middle period between two successive sampling times are omitted to simplify the illustration. FIG. 12(a) shows the case where the signal $S_{b2}$ is not fed to the sampling gate circuit 46 at any sampling time $t_{a1}$, $t_{a2}$, ... $t_{aN}$. FIG. 12(b) shows the case where the signal $S_{b2}$ is fed to the sampling gate 46 at each sampling time when the relative velocity V is constant. FIG. 12 (c) shows the case where the signal $S_{b2}$ is fed to the sampling gate 46 at each sampling time when the relative velocity V is changed. FIGS. 12(a), (b), (c) correspond to FIGS. 6(a), (b), (c).

When the signal $S_e$ is zero at each sampling time $t_{a1}$, $t_{a2}$, ... $t_{an}$ as shown in FIG. 12(a), the output signal $S_i$ of the wave-form converting circuit 52 is zero and the signal level (a-h) of the signal $S_h$ of the hold circuit 48 is also zero. Accordingly, the differential signal $S_j$ generated as an output from the differential circuit 53 is not detected. When the signal $S_{b1}$ is detected at the sampling time $t_{a1}$, $t_{a2}$, ... $t_{an}$ as shown in FIG. 12(b), the signal $S_{b2}$ is fed from the wave-form converting circuit 52. However, the level of the sampling is constant at the sampling time $t_{a1}$, $t_{a2}$, ... $t_{an}$ when the relative velocity V = o even though the signal $S_{b2}$ is detected. Accordingly, the signal level of hold circuit 48 is constant. Accordingly, the differential signal $S_j$ fed from the differential circuit 53 is not detected. However, when the signal $S_{b2}$ is detected at the sampling times $t_{a1}$, $t_{a2}$, ... $t_{an}$, and the relative velocity V of the vehicle to obstacle 12 is changed as shown in FIG. 12(c) so as to indicate the approach of the vehicle to the obstacle 12, the signals $S_{b1}$ repeatedly fed by the doppler effect occur after the sampling times $t_{a1}$, $t_{a2}$, ... $t_{an}$ and the output signals $S_i$ of the wave-form converting circuit also occur after the sampling times $t_{a1}$, $t_{a2}$, ... $t_{an}$ as shown in FIG. 12(c). Accordingly, the level of the signal $S_h$ which is sampled by the sampling gate circuit 46 and held by the hold circuit 48 is indicated by the signals having the doppler frequency $f_{d2}$ which is stepwise changed as shown by the full line of FIG. 12(c). Accordingly, when the hold signal $S_h$ shown by the full line is amplified by the amplifying circuit 49 and differentiated by the differential circuit 53, the large negative pulse $S_{jn}$ having doppler frequency $f_{d2}$ shown by the full line of FIG. 12(c) as detected.

In FIG. 12(c), the pulse $S_{jn}$ is fed only at the sampling time $t_{an}$ and the pulse is repeatedly detected by the frequency $f_{d2}$. On the other hand, when the vehicle is departing from the obstacle 12, the signal $S_{b1}$ which is repeatedly fed by the doppler effect is delayed subsequently to the sampling times $t_{a1}$, $t_{a2}$, ... $t_{an}$ as shown by the dotted line of FIG. 12(c). The output of the wave-form converting circuit 52 is delayed to the sampling time as shown by the dotted line of FIG. 12(c). Accordingly, the level of the signal $S_h$ which is sampled by the sampling gate circuit 46 and held by the hold circuit 48 is indicated by the signal having doppler frequency $f_{d2}$ which is stepwise changed as shown by the dotted line of FIG. 12(c). Accordingly, when the hold signal $S_h$ shown by the dotted line is amplified by the amplifying circuit 49 and differentiated by the differential circuit 53, a large positive pulse $S_{jp}$ having the doppler frequency $f_{d2}$ is generated as shown by the dotted line of FIG. 12(c). In FIG. 12(c), the pulse $S_{jp}$ is generated only at the sampling time $t_{an}$ and the pulse is repeatedly detected by the frequency $f_{d2}$. Thus, it is presumed that the repeat sampling frequency $f_3 = 1/T$ of the first transmission wave having frequency $f_2$ is higher than the maximum doppler frequency detected and is much lower than the frequency $f_o = |f_1 - f_2|$ Since the positive and negative pulses $S_{jp}$ having doppler frequency $f_{d2}$ are generated by the differential circuit 53 only when the relative velocity V of the vehicle to the obstacle 12 is changed, it is possible to detect whether the vehicle is approaching or departing from the reflector by detecting the polarity of the pulse. The positive or negative pulse having doppler frequency $f_{d2}$ can be generated by differential circuit 53 only when the distance from the antenna 10 to the obstacle 12 is in the range of $$\frac{C(T_a - T_0)}{2} \sim \frac{C T_a}{2}$$

and the relative velocity of the antenna 10 to the obstacle 12 is changed. Accordingly, it is possible to detect the distance, the relative velocity and the polarity of the relative velocity when the time periods $T_o$, $T_a$ are detected. When $T_o < T_a$, the signal component $S_c$ does not change the output of the sampling gate circuit 46.

Obviously numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An obstacle detecting system comprising:
   an oscillating device for generating and directing to an obstacle a first oscillating signal in a first time period and a second oscillating signal having a different frequency than that of the first oscillating signal in a second time period;
   a detector for mixing the signals received by the antenna and the output of the oscillating device to generate a detected signal which comprises a first signal component derived by mixing the first oscillating signal reflected by the obstacle and received by the antenna with the second oscillating signal generated by the oscillating device and a second signal component derived by mixing the second oscillating signal reflected by the obstacle and received by the antenna with the second oscillating signal generated by the oscillating device; and
   an information signal circuit for receiving the detected signal and generating distance information relating to the distance between the antenna and the obstacle by processing the first signal component in the detected signal and relative velocity information relating to the relative velocity of the antenna and the obstacle by processing the second signal component in the detected signal.

2. The obstacle detecting system according to claim 1, wherein the oscillating device includes a frequency modulation type oscillator which generates a first oscillation signal in the first time period and a second oscillation signal in the second time period.

3. The obstacle detecting system according to claim 2, wherein the frequency modulation type oscillator includes a gunn diode for generating the oscillation signal and a varactor diode for modulating the frequency of the oscillation signal fed from the gunn diode.

4. The obstacle detecting system according to claim 3, wherein the oscillating device includes a reference signal generating circuit for generating a reference pulse and a modulation signal generating circuit for generating a modulating signal by receiving the reference pulse and means for applying the modulation signal to the varactor diode.

5. The obstacle detecting system according to claim 1, wherein a gate circuit which is in its open state for a predetermined time period after the initiation of the first oscillation signal controls the path of the first signal component and the distance information is generated as an output of the gate circuit.

6. The obstacle detecting system according to claim 1, wherein the information signal circuit includes at least one sampling means for sampling the first signal component at a time after initiation of the first oscillation signal and the output of the sampling means is representative of distance information and relative velocity information.

7. The obstacle detecting system according to claim 6, wherein a hold circuit is provided in the output part of the sampling means and the output of the sampling means is maintained by the hold circuit to generate distance information and relative velocity information.

8. The obstacle detecting system according to claim 6, wherein the information signal circuit includes a plurality of sampling means for sampling the first signal component at differing times after initiation of the first oscillation signal.

9. The obstacle detecting system according to claim 6, wherein the sampling means provides a first plurality of samplings after initiation of the first oscillation signal in the first time period and a second plurality of samplings after initiation of the first oscillation signal in the second time period.

10. The obstacle detecting system according to claim 9, which comprises a first gate circuit for selecting an output of the sampling means in the first period and a second gate circuit for selecting an output of the sampling means in the second period whereby the gate circuit generates distance information and relative velocity information.

11. An obstacle detecting system comprising:
an oscillating device for generating and directing to an obstacle a first oscillating signal in a first time period and a second oscillating signal having a different frequency than that of the first oscillating signal in a second time period;
an antenna for receiving the signals reflected from the obstacle;
a detector for mixing the signals received by the antenna and the output of the oscillating device to generate a detected signal which comprises a first signal component derived by mixing the first oscillating signal reflected by the obstacle and received by the antenna with the second oscillating signal generated by the oscillating device and a second signal component derived by mixing the second oscillating signal reflected by the obstacle and received by the antenna with the second oscillating signal generated by the oscillating device;
an information signal circuit for receiving the detected signal and generating information relating to the distance between the antenna and the obstacle and information relating to the relative velocity of the antenna and the obstacle;
a wave-form converting circuit for converting the first signal component to a saw-tooth wave-form having the same frequency;
the information signal circuit comprising at least one sampling means for receiving the output of the wave-form converting circuit for sampling the first signal component at a time after initiation of the first oscillation signal, the output of the sampling means being representative of distance information and relative velocity information;
a hold circuit to receive the output of the sampling means, the output of the sampling means being maintained by the hold circuit to generate distance information and relative velocity information; and
a differential circuit for differentiating an output signal of the hold circuit whereby the output of the differential circuit generates distance information and relative velocity information.

* * * * *